US012794627B2

(12) United States Patent
He et al.

(10) Patent No.: US 12,794,627 B2
(45) Date of Patent: Nov. 10, 2026

(54) DYNAMIC ADAPTATION OF REFERENCE SIGNAL TRANSMISSIONS IN WIRELESS COMMUNICATIONS

(71) Applicant: Apple Inc., Cupertino, CA (US)

(72) Inventors: Hong He, Cupertino, CA (US); Dawei Zhang, Saratoga, CA (US); Wei Zeng, San Diego, CA (US); Haitong Sun, Irvine, CA (US); Chunhai Yao, Beijing (CN); Yushu Zhang, Beijing (CN); Seyed Ali Akbar Fakoorian, San Diego, CA (US); Oghenekome Oteri, San Diego, CA (US); Weidong Yang, San Diego, CA (US); Sigen Ye, Whitehouse, NJ (US)

(73) Assignee: Apple Inc., Cupertino, CA (US)

( * ) Notice: Subject to any disclaimer, the term of this patent is extended or adjusted under 35 U.S.C. 154(b) by 650 days.

(21) Appl. No.: 17/438,586

(22) PCT Filed: Jan. 13, 2021

(86) PCT No.: PCT/CN2021/071391
§ 371 (c)(1),
(2) Date: Sep. 13, 2021

(87) PCT Pub. No.: WO2022/151010
PCT Pub. Date: Jul. 21, 2022

(65) Prior Publication Data
US 2022/0271886 A1 Aug. 25, 2022

(51) Int. Cl.
*H04L 5/00* (2006.01)

(52) U.S. Cl.
CPC .......... *H04L 5/0051* (2013.01); *H04L 5/0082* (2013.01)

(58) Field of Classification Search
CPC ....... H04L 5/0051; H04L 5/0082; H04L 1/08; H04L 5/0094; H04L 5/0044; H04L 5/0048; H04L 5/001; H04L 5/0026
See application file for complete search history.

(56) References Cited

U.S. PATENT DOCUMENTS 11,206,549 B1 * 12/2021 Eyuboglu ......... H04W 72/1273
2013/0250893 A1 9/2013 Li et al.
(Continued)

FOREIGN PATENT DOCUMENTS

CN 109818721 A 5/2019
WO 2020264121 A1 12/2020

OTHER PUBLICATIONS

International Search Report for PCT/CN2021/071391; Sep. 28, 2021.
(Continued)

*Primary Examiner* — Justin T Van Roie
(74) *Attorney, Agent, or Firm* — Kowert, Hood, Munyon, Rankin & Goetzel, P.C.

(57) ABSTRACT

Transmission of uplink demodulation reference signals (DMRSs) may be dynamically adapted for mobile devices. Downlink control information (DCI) that schedules uplink transmission(s) of the mobile device may include an information element (IE) corresponding to a DMRS to be transmitted by the UE during the uplink transmission(s). The IE enables the mobile device to determine when to transmit DMRSs during the scheduled uplink transmission(s). The mobile device may identify a corresponding DMRS pattern indicated by the IE, with the DMRS pattern defining how many DMRSs to transmit during the uplink transmission(s), how many DMRSs to transmit in a given time interval (TTI) bundle in the uplink transmission(s), how many DMRSs to transmit in a given repetition of the TTI bundle, and/or where the relative position(s) of the DMRSs are within the
(Continued)

1200

DMRS Pattern signaling using DCI format

| DMRS-position field | DMRS patterns |
|---|---|
| 00 | Reuse a predefined DMRS pattern (e.g. defined in the standard), without DMRS overhead reduction |
| 01 | Pattern 1: reduce DMRS Density to 1/X over a TTI bundle |
| 10 | Pattern 2: reduce DMRS Density to 1/Y over a TTI bundle |
| 11 | Pattern 3: reduce DMRS Density to 1/Z a TTI bundle |

1210

1-bit DMRS Pattern signaling using DCI format (X=2, Y=3, Z=3)

| DMRS position field | Case 2 | Case 3 | Case 4 |
|---|---|---|---|
| 0 | Reuse a predefined DMRS pattern (e.g. defined in the standard), without DMRS overhead reduction | | |
| 1 | For X=2, transmit 1st or 2nd DMRS symbol only | For Y=3, transmit only one of three DMRS symbols; e.g. 2nd DMRS | For Z=4, transmit only one of four DMRS symbols; e.g. 2nd or 3rd DMRS |

1220

2-bit DMRS Pattern signaling using DCI format (X=2, Y=3, Z=3)

| DMRS-position field | Case 2 | Case 3 | Case 4 |
|---|---|---|---|
| 00 | Reusing the DMRS pattern defined in Rel-15/16, without DMRS overhead reduction | | |
| 01 | For X=2, transmit 1st or 2nd DMRS symbol only | Not applied | For X=2, transmit a pair of (1st, 3rd) or (2nd, 4th) DMRS symbols only |
| 10 | Not applied | For Y=3, transmit one of three DMRS symbol only e.g. 2nd DMRS | Not applied |
| 11 | Not applied | Not applied | For Z=4, transmit one of four DMRS symbol only e.g. 2nd or 3rd DMRS |

given repetition and the given TTI bundle. The DMRS patterns may be configured for the mobile device via higher layer signaling or may be hard-coded.

19 Claims, 12 Drawing Sheets

(56) References Cited

U.S. PATENT DOCUMENTS

| | | | | |
|---|---|---|---|---|
| 2016/0134408 | A1 | 5/2016 | Kim et al. | |
| 2021/0092627 | A1* | 3/2021 | Radulescu | H04L 5/0053 |
| 2021/0385036 | A1* | 12/2021 | Bae | H04L 5/0044 |
| 2021/0400676 | A1* | 12/2021 | Faxér | H04L 25/0226 |
| 2022/0200759 | A1* | 6/2022 | Yoshioka | H04L 5/0007 |
| 2022/0361201 | A1* | 11/2022 | Yoshioka | H04L 1/08 |
| 2023/0045134 | A1* | 2/2023 | Yuan | H04L 5/0051 |
| 2023/0361957 | A1* | 11/2023 | Abdelghaffar | H04L 5/0078 |

OTHER PUBLICATIONS

Ericsson "On UL DMRS position for 2os TTI" 3GPP TSG-RAN WG1 Meeting #88bis R1-1706071; Spokane, US Apr. 3-7, 2017.

* cited by examiner

1200

DMRS Pattern signaling using DCI format

| DMRS-position field | DMRS patterns |
|---|---|
| 00 | Reuse a predefined DMRS pattern (e.g. defined in the standard), without DMRS overhead reduction |
| 01 | Pattern 1: reduce DMRS Density to 1/X over a TTI bundle |
| 10 | Pattern 2: reduce DMRS Density to 1/Y over a TTI bundle |
| 11 | Pattern 3: reduce DMRS Density to 1/Z a TTI bundle |

1210

1-bit DMRS Pattern signaling using DCI format (X=2, Y=3, Z=3)

| DMRS-position field | Case 2 | Case 3 | Case 4 |
|---|---|---|---|
| 0 | Reuse a predefined DMRS pattern (e.g. defined in the standard), without DMRS overhead reduction | | |
| 1 | For X=2, transmit 1st or 2nd DMRS symbol only | For Y=3, transmit only one of three DMRS symbols; e.g. 2nd DMRS | For Z=4, transmit only one of four DMRS symbols; e.g. 2nd or 3rd DMRS |

1220

2-bit DMRS Pattern signaling using DCI format (X=2, Y=3, Z=3)

| DMRS-position field | Case 2 | Case 3 | Case 4 |
|---|---|---|---|
| 00 | Reusing the DMRS pattern defined in Rel-15/16, without DMRS overhead reduction | | |
| 01 | For X=2, transmit 1st or 2nd DMRS symbol only | Not applied | For X=2, transmit a pair of (1st, 3rd) or (2nd, 4th) DMRS symbols only |
| 10 | Not applied | For Y=3, transmit one of three DMRS symbol only e.g. 2nd DMRS | Not applied |
| 11 | Not applied | Not applied | For Z=4, transmit one of four DMRS symbol only e.g. 2nd or 3rd DMRS |

FIG. 12

DYNAMIC ADAPTATION OF REFERENCE SIGNAL TRANSMISSIONS IN WIRELESS COMMUNICATIONS

PRIORITY CLAIM INFORMATION

This application is a national stage application of International Application No. PCT/CN2021/071391, filed on Jan. 13, 2021, titled "Dynamic Adaptation of Reference Signal Transmissions in Wireless Communications", which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, including dynamic adaptation of reference signal transmission in wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standard moving beyond the current International Mobile Telecommunications-Advanced (IMT-Advanced) Standards is called 5th generation mobile networks or 5th generation wireless systems, referred to as 3GPP NR (otherwise known as 5G-NR or NR-5G for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

One aspect of cellular communication systems involves uplink data/signal transmissions from mobile devices to base stations, and the transmission of reference signals, for example the transmission of demodulation reference signals (DMRSs). Improvements in the field are desired.

SUMMARY OF THE INVENTION

Embodiments are presented herein of, inter alia, of methods and procedures for various devices, e.g. wireless communication devices, to dynamically adapt transmission of reference signals, e.g. demodulation reference signals (DMRSs) during wireless communications. Embodiments are further presented herein for wireless communication systems containing wireless communication devices (UEs) and/or base stations and access points (APs) communicating with each other within the wireless communication systems.

According to some aspects, transmission of uplink DMRSs may be dynamically adapted for mobile devices, or use equipments (UEs), by enabling the UE to select a most appropriate DMRS pattern from a specified number of patterns to improve throughput. To this end, downlink control information (DCI) that schedules uplink transmission(s) of the UE may also include an information element (IE) providing DMRS position information that enables the UE to determine when DMRS(s) are to be transmitted during the scheduled uplink transmission. The mobile device may use to identify a corresponding DMRS pattern based on the position information. The DMRS pattern may define how many DMRSs to transmit during the scheduled uplink transmission(s), how many DMRSs to transmit in a given time interval (TTI) bundle in the uplink transmission(s), how many DMRSs to transmit in a given repetition of the TTI bundle, and where the relative position of each transmitted DMRSs is within the given repetition and the given TTI bundle.

The DMRS patterns may defined and provided in a variety of different ways. According to a first approach, the DMRS patterns may be hard-coded, e.g. in the specification, and a subset of selected DMRS patterns on a per UE basis may be selected and provided via RRC signaling to the UE. According to a second approach, the DMRS patterns may be predefined or preexisting DMRS patterns, e.g. DMRS patterns that are already defined in Rel-15/16 of the 3GPP specification. In this case, one of these different DMRS patterns (based on single repetition or aggregated repetitions) may be selected by the UE, based on the DMRS position information in the DCI. According to a third approach, specific DMRS patterns may be configured for a UE by the base station and provided to the UE via RRC signaling, with the UE selecting from these DMRS patterns, based on the DMRS position information in the DCI. According to a fourth approach, similar to the first approach, the DMRS patterns may be hard-encoded, e.g. in the specification, but defined specifically on a per-TTI bundle basis. In case of the first approach and third approach, the DMRS pattern may be provided or configured via RRC signaling, while the second approach and fourth approach do not require higher level signaling to provide the DMRS patterns as they are predefined patterns (e.g. hard-coded in the specification) and may therefore already be known by the UE.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 12 shows three tables illustrating different respective examples of DMRS pattern signaling using DCI format, according to some embodiments.

Figure 1:
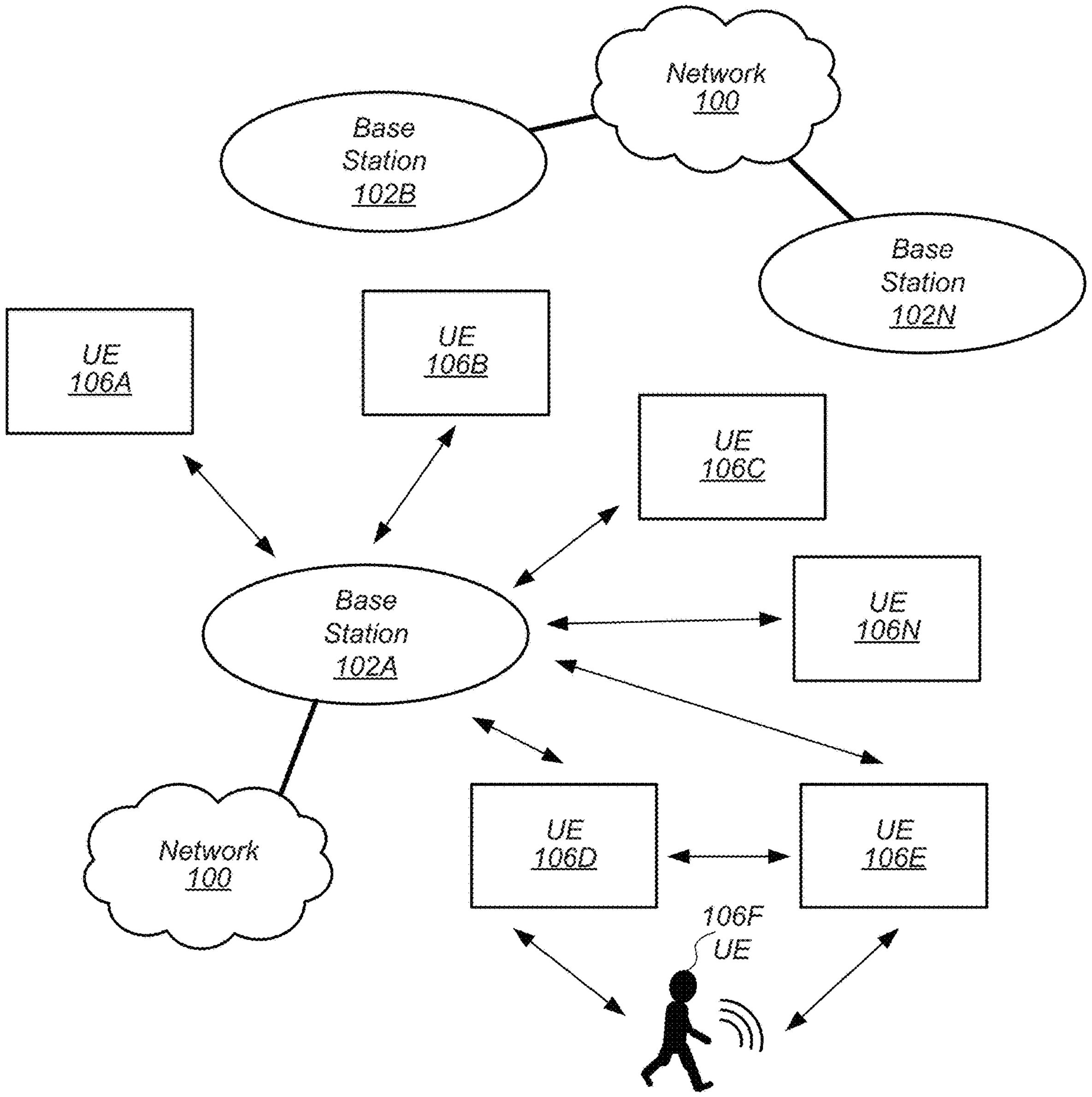
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AF: Application Function
AMF: Access and Mobility Management Function
AMR: Adaptive Multi-Rate
AP: Access Point
APN: Access Point Name
APR: Applications Processor
BS: Base Station
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DMRS: Demodulation Reference Signal
DN: Data Network
DSDS: Dual SIM Dual Standby
DYN: Dynamic
EDCF: Enhanced Distributed Coordination Function
eSNPN: Equivalent Standalone Non-Public Network
FDD: Frequency Division Duplexing
FT: Frame Type
GAA: General Authorized Access
GPRS: General Packet Radio Service
GSM: Global System for Mobile Communication
GTP: GPRS Tunneling Protocol
HPLMN: Home Public Land Mobile Network
IMS: Internet Protocol Multimedia Subsystem
IOT: Internet of Things
IP: Internet Protocol
LAN: Local Area Network
LBT: Listen Before Talk
LQM: Link Quality Metric
LTE: Long Term Evolution
MCC: Mobile Country Code
MNO: Mobile Network Operator
NAS: Non-Access Stratum
NF: Network Function
NG-RAN: Next Generation Radio Access Network
NID: Network Identifier
NMF: Network Identifier Management Function
NPN: Non-Public (cellular) Network
NRF: Network Repository Function
NSI: Network Slice Instance
NSSAI: Network Slice Selection Assistance Information
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSS: Primary Synchronization Signal
PT: Payload Type
QBSS: Quality of Service Enhanced Basic Service Set
QI: Quality Indicator
RA: Registration Accept
RAT: Radio Access Technology
RF: Radio Frequency
ROHC: Robust Header Compression
RR: Registration Request
RTP: Real-time Transport Protocol
RX: Reception/Receive
SAS: Spectrum Allocation Server
SD: Slice Descriptor
SI: System Information
SIB: System Information Block
SID: System Identification Number
SIM: Subscriber Identity Module
SGW: Serving Gateway
SMF: Session Management Function
SNPN: Standalone Non-Public Network
SSS: Secondary Synchronization Signal
SUPI: Subscription Permanent Identifier
TBS: Transport Block Size
TCP: Transmission Control Protocol
TDD: Time Division Duplexing
TDRA: Time Domain Resource Allocation
TX: Transmission/Transmit
UAC: Unified Access Control
UDM: Unified Data Management
UDR: User Data Repository
UE: User Equipment UI: User Input
UL: Uplink (from UE to BS)
UMTS: Universal Mobile Telecommunication System
UPF: User Plane Function
URM: Universal Resources Management
URSP: UE Route Selection Policy
USIM: User Subscriber Identity Module
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™ Microsoft XBox™, etc.), portable gaming devices (e.g., Nintendo DS™, PlayStation Portable™, Gameboy Advance™, iPod™), laptops, wearable devices (e.g. Apple Watch™ Google Glass™), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Bandwidth Part (BWP)—A carrier bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network is defined as a part of a 3GPP system which is independent of the connection technology (e.g. the Radio Access Technology, RAT) of the UEs. The UEs may connect to the core network via a radio access network, RAN, which may be RAT-specific.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
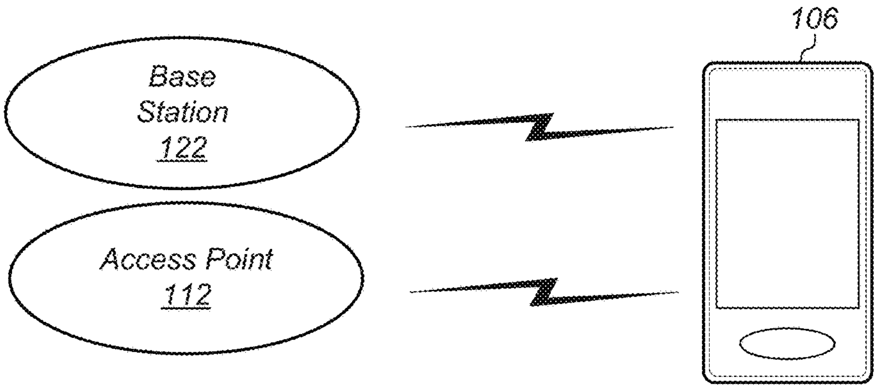
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may transmit reference signals, according to various aspects disclosed herein.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102A may facilitate communication between the user devices 106 and/or between the user devices 106 and the network 100. In particular, the cellular base station 102A may provide UEs 106 with various telecommunication capabilities, such as voice, short message service (SMS) and/or data services. The communication area (or coverage area) of the base station 106 may be referred to as a "cell." It is noted that "cell" may also refer to a logical identity for a given wireless communication coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1xRTT, 1×EV-DO, HRPD, eHRPD), Wi-Fi, WiMAX etc. Note that if the base station 102A is implemented in the context of LTE, it may alternately be referred to as an 'eNodeB' or 'eNB'. Similarly, if the base station 102A is implemented in the context of 5G NR, it may alternately be referred to as 'gNodeB' or 'gNB'. In some embodiments, the base station 102 (e.g. an eNB in an LTE network or a gNB in an NR network) may communicate with at least one UE having the capability to transmit reference signals according to various aspects disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to private networks. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices 106 and/or between the user devices 106 and the network 100. In particular, the cellular base station 102A may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-106N as illustrated in FIG. 1, each one of UE(s) 106 may also be capable of receiving signals from (and may possibly be within communication range of) one or more other cells (possibly provided by base stations 102B-102N and/or any other base stations), which may be referred to as "neighboring cells". Such cells may also be capable of facilitating communication in-between user devices 106 and/or between user devices 106 and the network 100. Such cells may include "macro" cells, "micro" cells, "pico" cells, and/or cells which provide any of various other granularities of service area size. For example, base stations 102A-102B illustrated in FIG. 1 may be macro cells, while base station 102N may be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting in a similar manner with the vehicles represented by UEs 106D and 106E. Various aspects of vehicles communicating in a network exemplified in FIG. 1 are disclosed, for example, in the context of vehicle-to-everything (V2X) communications such as the communications specified by certain versions of the 3GPP standard, among others.

FIG. 2 illustrates an exemplary user equipment 106 (e.g., one of UEs 106A through 106N) in communication with the base station 122 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1×RTT or NR, and separate radios for communicating using each of Wi-Fi and BLUETOOTH™. Other configurations are also possible.

Figure 3:
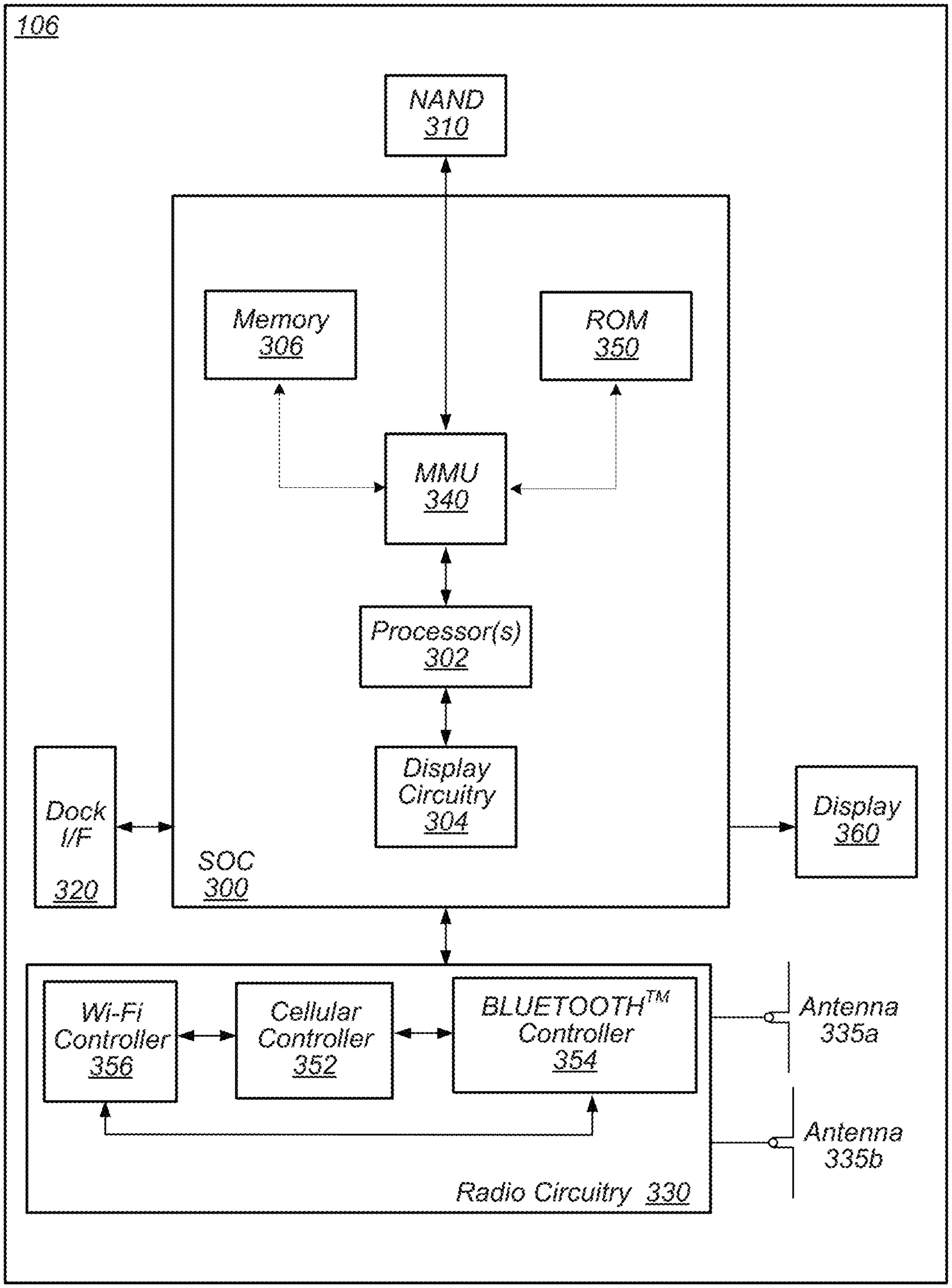
FIG. 3 illustrates an exemplary block diagram of a UE, according to some embodiments.

FIG. 3—Block Diagram of an Exemplary UE

FIG. 3 illustrates a block diagram of an exemplary UE 106, according to some aspects. As shown, the UE 106 may include a system on chip (SOC) 300, which may include various elements/components for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to transmit reference signals according to various aspects disclosed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 to transmit reference signals according to various aspects disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

Figure 5:
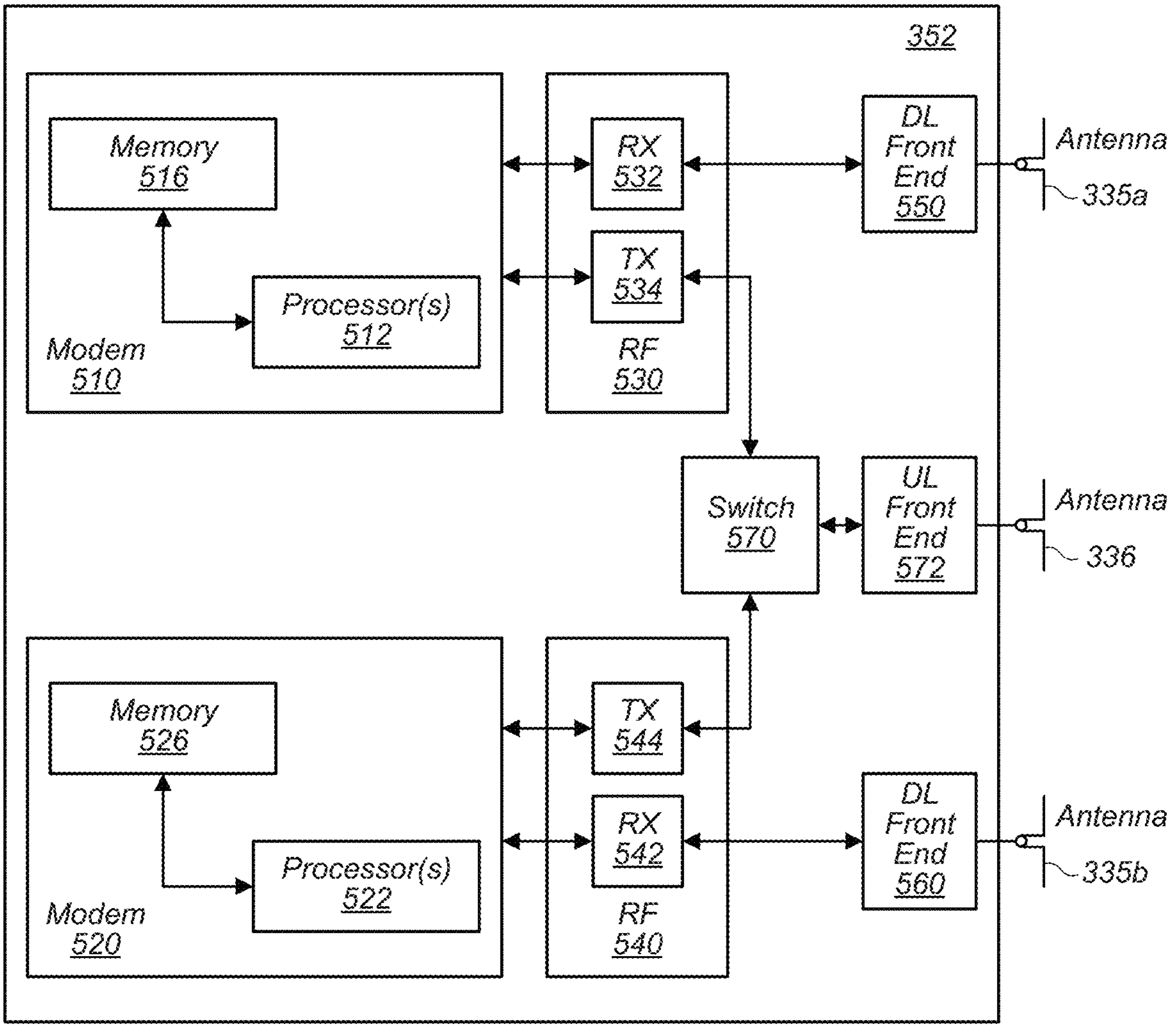
FIG. 5 shows an exemplary simplified block diagram illustrative of cellular communication circuitry, according to some embodiments.

In some embodiments, radio circuitry 330 may include separate controllers dedicated to controlling communications for various respective RATs and/or RAT standards. For example, as shown in FIG. 3, radio circuitry 330 may include a Wi-Fi controller 356, a cellular controller (e.g. LTE and/or NR controller) 352, and BLUETOOTH™ controller 354, and according to at least some aspects, one or more or all of these controllers may be implemented as respective integrated circuits (ICs or chips, for short) in communication with each other and with SOC 300 (e.g. with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments may have fewer or more similar controllers for various different RATs and/or RAT standards that may be implemented in UE device 106. For example, at least one exemplary block diagram illustrative of some embodiments of cellular controller 352 is shown in FIG. 5 and will be further described below.

Figure 4:
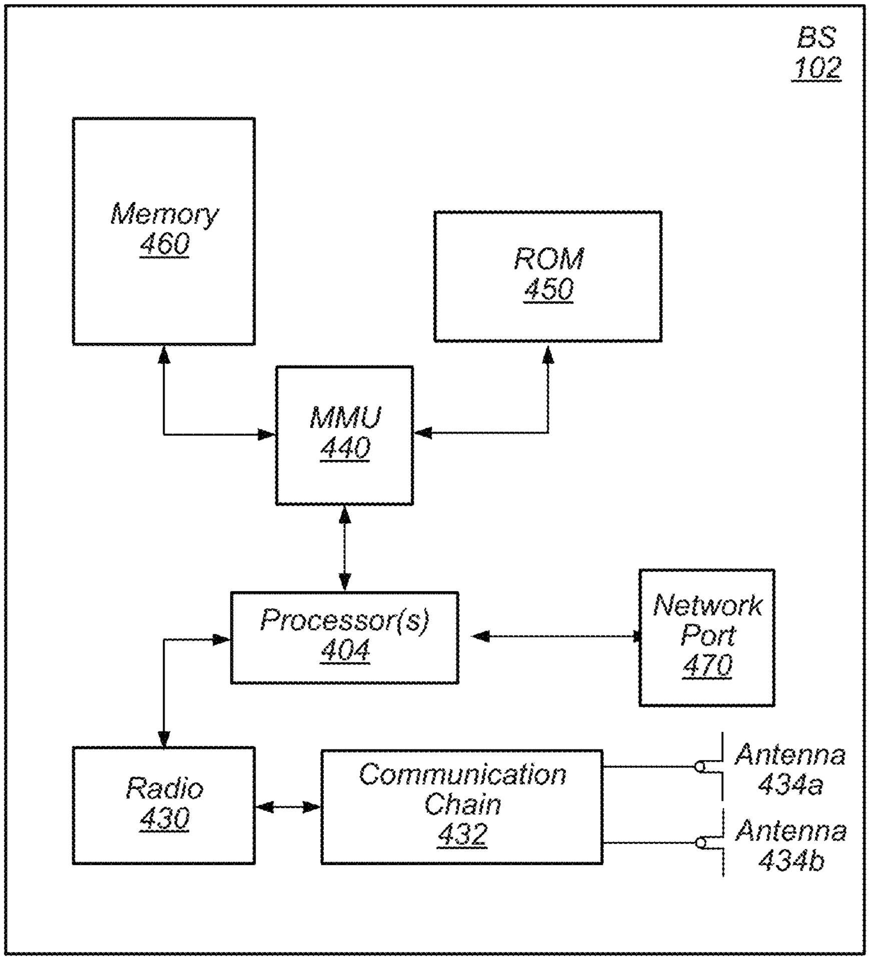
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434*a*, and possibly multiple antennas (e.g. illustrated by antennas 434*a* and 434*b*), for performing wireless communication with mobile devices and/or other devices. Antennas 434*a* and 434*b* are shown by way of example, and base station 102 may include fewer or more antennas. Overall, the one or more antennas, which may include antenna 434*a* and/or antenna 434*b*, are collectively referred to as antenna 434 or antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that transmits reference signals as disclosed herein. Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices that transmit reference signals according to various embodiments disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335*a-b* and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5GNR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more components. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335*b*. As another example, the cellular communication circuitry 352 may not include the modem 510, the RF front end 530, the DL front end 550, and/or the antenna 335*a*. In some embodiments, the cellular communication circuitry 352 may also not include the switch 570, and the RF front end 530 or the RF front end 540 may be in communication, e.g., directly, with the UL front end 572.

Physical Transmission Channels and Reference Signal Transmission

3GPP LTE/NR defines a number of downlink (DL) physical channels for downlink communications, categorized as transport or control channels, to carry information blocks received from the MAC and higher layers. 3GPP LTE/NR similarly defines a number of (UL) physical channels for uplink communications. The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information (DCI) message. For example, the DCI may include a transmission configuration indication (TCI) relating to beamforming, with the TCI including configurations such as quasi-co-located (QCL) relationships between the downlink reference signals (DL-RSs) in one Channel State Information RS (CSI-RS) set and the PDSCH Demodulation Reference Signal (DMRS) ports. Each TCI state can contain parameters for configuring a QCL relationship between one or two downlink reference signals and the DMRS ports of the PDSCH, the DMRS port of PDCCH or the CSI-RS port(s) of a CSI-RS resource. Multiple PDCCHs can be transmitted in the same subframe using Control Channel Elements (CCE), each of which is a set of resource elements known as Resource Element Groups (REG). The PDCCH can employ quadrature phase-shift keying (QPSK) modulation, with a specified number (e.g. four) of QPSK symbols mapped to each REG. Furthermore, a specified number (e.g. 1, 2, 4, or 8) of CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the base station (e.g. eNB or gNB). The base station uses the uplink scheduling grant (e.g. in DCI) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

To increase protocol efficiency and to keep transmissions contained within a slot or beam without having to depend on other slots and beams, NR introduced four main reference signals, the Demodulation Reference Signal (DMRS), the Phase Tracking Reference Signal (PTRS), the Sounding Reference Signal (SRS), and the Channel State Information Reference Signal (CSI-RS). DMRS is used to estimate the radio channel for demodulation, and is UE-specific. It can be beamformed, confined in a scheduled resource, and transmitted only when necessary, both in downlink and uplink. To support multiple-layer MIMO transmissions, multiple orthogonal DMRS ports can be scheduled, one for each layer. Orthogonality is achieved by frequency division multiplexing (FDM; comb structure) and timed division multiplexing TDM and code division multiplexing (CDM; with cyclic shift of the base sequence or orthogonal cover codes). The basic DMRS pattern is front loaded and takes into account the early decoding requirement to support low-latency applications. For low-speed scenarios, the DMRS uses low density in the time domain, while in case of high-speed scenarios the time density of DMRS is increased to track fast changes in the radio channel.

Coverage is one of the key factors that an operator considers when commercializing cellular communication networks due to its direct impact on service quality as well as CAPEX (capital expenses) and OPEX (operating expenses). Despite the importance of coverage for the success of NR commercialization, thorough coverage evaluation and comparison with legacy RATs considering all NR specification details have not been performed up to now. During discussions of the 3GPP NR Standard (specifically, during the RAN #86 meeting), a new study item, 'New SID on NR coverage enhancement' was approved to study potential coverage enhancement solutions for specific scenarios for both FR1 and FR2, targeting different scenarios, such as Urban, rural, indoor, TDD/FDD scenarios with VoIP and eMBB services. During the RAN1 #103 meeting, various observations were made for FR1, based on the outcome of studies based on link-level evaluations. The bottleneck channels were identified as PUSCH (for eMBB and VoIP; indicated as first priority), and PRACH format B4, PUSCH of Msg.3, PUCCH format 1, PUCCH format 3 with 11 bit, PUCCH format 3 with 22 bit. Broadcast PDCCH (indicated as second priority).

Currently, the DMRS transmission pattern(s) is(are) semi-statically configured by a base station via RRC signaling for a UE, and the same DMRS pattern is applied for all repetitions. This may result in spectrum efficiency performance issues. In some extreme cases, applying the same DMRS pattern for all repetitions causes unnecessary DMRS overhead due to the mismatched DMRS pattern overhead with respect to the instant channel, or a short duration of Type-B based repetition in a slot. There is therefore a need to develop detailed signaling mechanisms that enable fast and efficient DMRS pattern adaptation.

Figure 6:
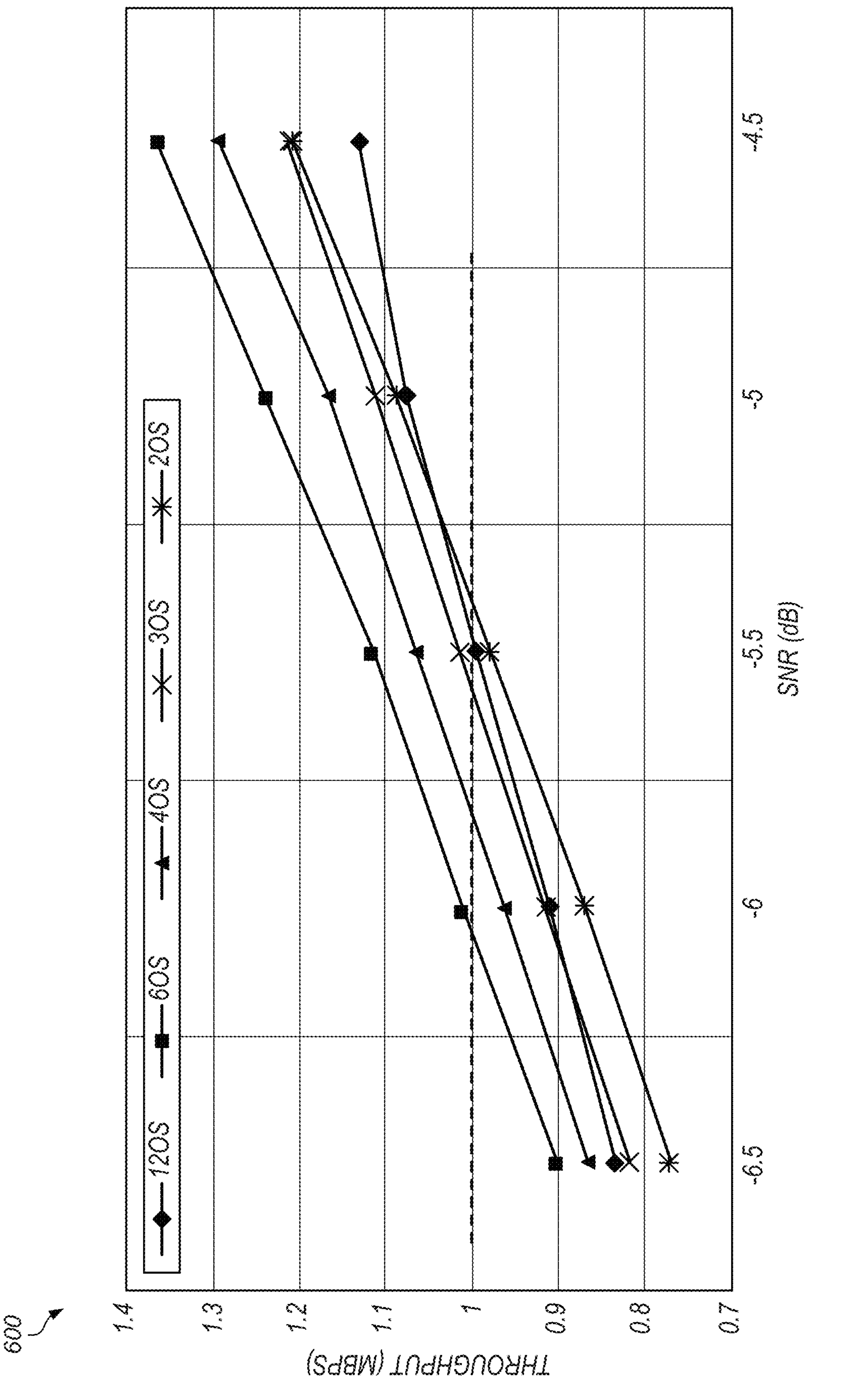
FIG. 6 is a diagram illustrating transmission throughput versus signal to noise ratio for different DMRS patterns.

According to some aspects, uplink transmission coverage, e.g. physical uplink shared channel (PUSCH) coverage, performance may be improved by using adaptive DMRS configuration per (DMRS) transmission occasion. In other words, instead of applying the same DMRS pattern for all repetitions, the DMRS transmission pattern may be dynamically configured for each DMRS occasion. Different solutions may be considered for improving channel estimation performance, e.g. DMRS bundling across different slots/repetitions, and dynamic adaptation of DMRS overhead depending on the varied UE location due to mobility and the signal to noise ratio (SNR) operating point. For example, as illustrated in the SNR vs, throughput graph 600 in FIG. 6, a 50% throughput improvement may be achieved with proper DMRS pattern settings based on channel conditions e.g. based on Doppler value and the SNR operating point.

DMRS Adaptation for Physical Uplink Shared Channel (PUSCH) Transmissions

In order to implement DMRS adaptation, a 'DMRS position' information element (IE) may be added into the scheduling downlink control information DCI format. In other words, an IE may be added in the DCI that is transmitted to a UE to schedule corresponding uplink transmission(s), e.g. a corresponding PUSCH transmission(s). The IE may indicate/provide a set of different codes/values corresponding to respective DMRS patterns.

First Approach

An example of different codes and corresponding DMRS patterns for DMRS adaptation operation according to a first approach is provided in Table 1 below.

TABLE 1

DMRS Pattern Signaling IE in DCI Format

| DMRS position indicator in uplink scheduling DCI | Corresponding DMRS pattern |
|---|---|
| 000 | Sparse pattern 1 |
| 001 | Sparse pattern 2 |
| 010 | Sparse pattern 3 |
| 011 | Sparse pattern 4 |
| 100 | Pos0 |
| 101 | Pos1 |
| 110 | Pos2 |
| 111 | Pos3 |

According to some aspects, the specified number 'M' of different DMRS patterns (e.g. as shown in Table 1) may be selectively configured by the base station via higher layer signaling, e.g. via RRC signaling, for a given UE. To put it another way, the base station may configure a specified number of different reference signal patterns, e.g. DMRS patterns, and provide information descriptive/indicative of these patterns to the UE via higher layer signaling. Then, a specified number [$\log_2$ (M)] of corresponding bits may be used for a 'DMRS position' IE in the scheduling DCI format transmitted (e.g. in a physical downlink control channel; PDCCH) on the UE-specific search space (USS) to enable the UE to dynamically switch between the 'M' DMRS patterns for each PUSCH transmission.

In some aspects, the patterns Pos0, Pos1, Pos2 and Pos3 may be predefined patterns, e.g. defined in Rel-15/16 of the 3GPP standard, and each of the sparse DMRS patterns (e.g. sparse pattern 1, sparse pattern 2, etc. as shown in Table 1) may be configured via higher layer signaling, e.g. via RRC signaling, and may include two parameters:

a TTI bundle length 'N' that defines the TTI length in units of transmission occasion; e.g., N=2, 3, 4 or 7, indicating the number of transmission occasions within the given TTI bundle; and an occasion index in the TTI bundle for DMRS transmission, indicating the DMRS occasion of the transmission occasions of the TTI bundle, or relative position of the DMRS occasion, within the TTI bundle.

Figure 7:
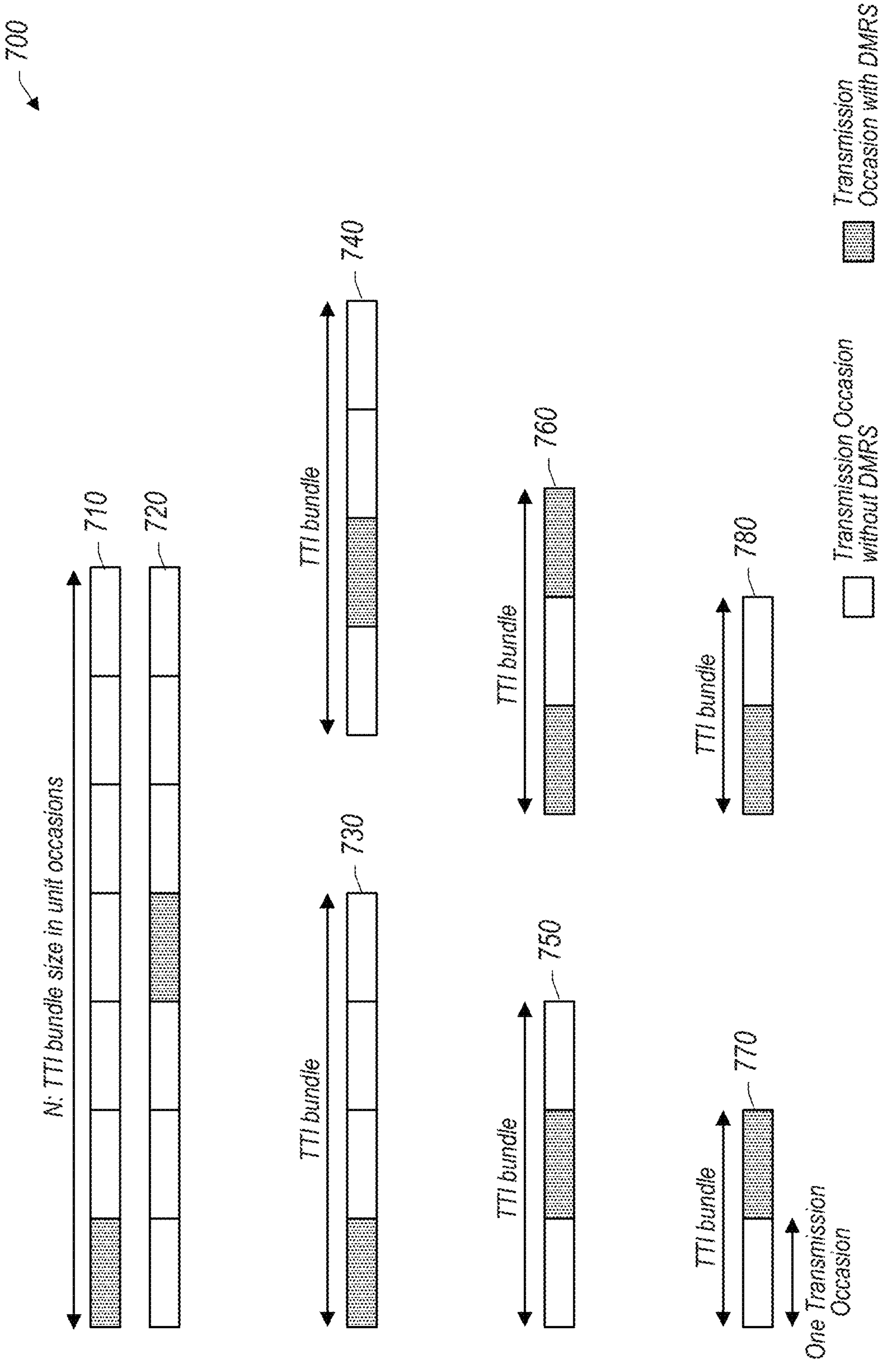
FIG. 7 is a diagram illustrating DMRS patterns for DCI-base adaptations, according to some embodiments.

Pursuant to the above, the occasion index may be provided/indicated via a bitmap with each bit associated with one occasion in the TTI bundle. FIG. 7 provides various examples of DMRS patterns used for DCI-based DMRS pattern adaptation. The value of N is 7 for patterns 710 and 720, 4 for patterns 730 and 740, 3 for patterns 750 and 760, and 2 for patterns 770 and 780. As one example, length-3 DMRS pattern 750 is indicated as '100', while, length-3 DMRS pattern 760 is indicated as '101', with a value of '1' indicating a DMRS occasion. In some sparse DMRS patterns, the number of DMRS occasions within a TTI bundle may be limited, e.g. it may be limited to 1. In some embodiments, certain patterns may be hard-encoded. For example, two patterns may be hard-encoded in the specification such that one may be in the first occasion and the other may be in the occasion k=integer quotient of (N/2), denoted here as [N/2], to tradeoff between decoding latency and channel estimation performance for PUSCH. For example, if N=7, k=[N/2]=3, e.g. as illustrated in DMRS pattern 720 in FIG. 7.

Figure 8:
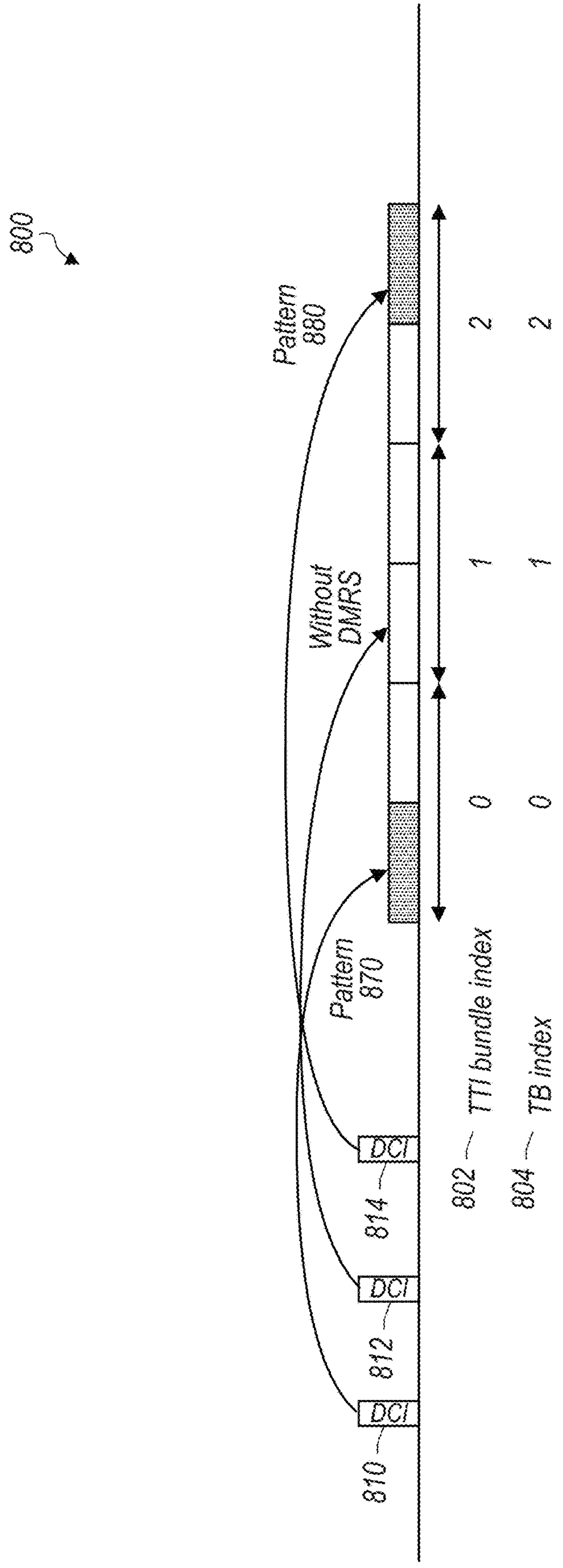
FIG. 8 is diagram illustrating an example of DMRS transmission pattern, according to some embodiments.

According to some aspects, one sparse DMRS pattern may include no DMRS symbols to minimize the DMRS overhead by sharing (using) the DMRS transmission from the previous or subsequent TTI bundle as illustrated in FIG. 8. Referring to FIG. 8, it is assumed that the TTI bundle size is N=2 and three different transport blocks (TBs) are transmitted over the three different TTI bundles, which include TTI bundle 1, TTI bundle 2, and TTI bundle 3, respectively. As illustrated in FIG. 8, DCI 810 schedules TTI bundle 0, DCI 812 schedules TTI bundle 1, and DCI 814 schedules TTI bundle 0. To minimize DMRS overhead, for example for a low mobility UE, DCI 812 may correspond to a TTI bundle that doesn't include a DMRS transmission (e.g. DCI 812 may indicate that no DMRS symbols are needed for TTI bundle 1, to share DMRS with the earlier TTI bundle 0 or the subsequent TTI bundle 2.

Figure 9:
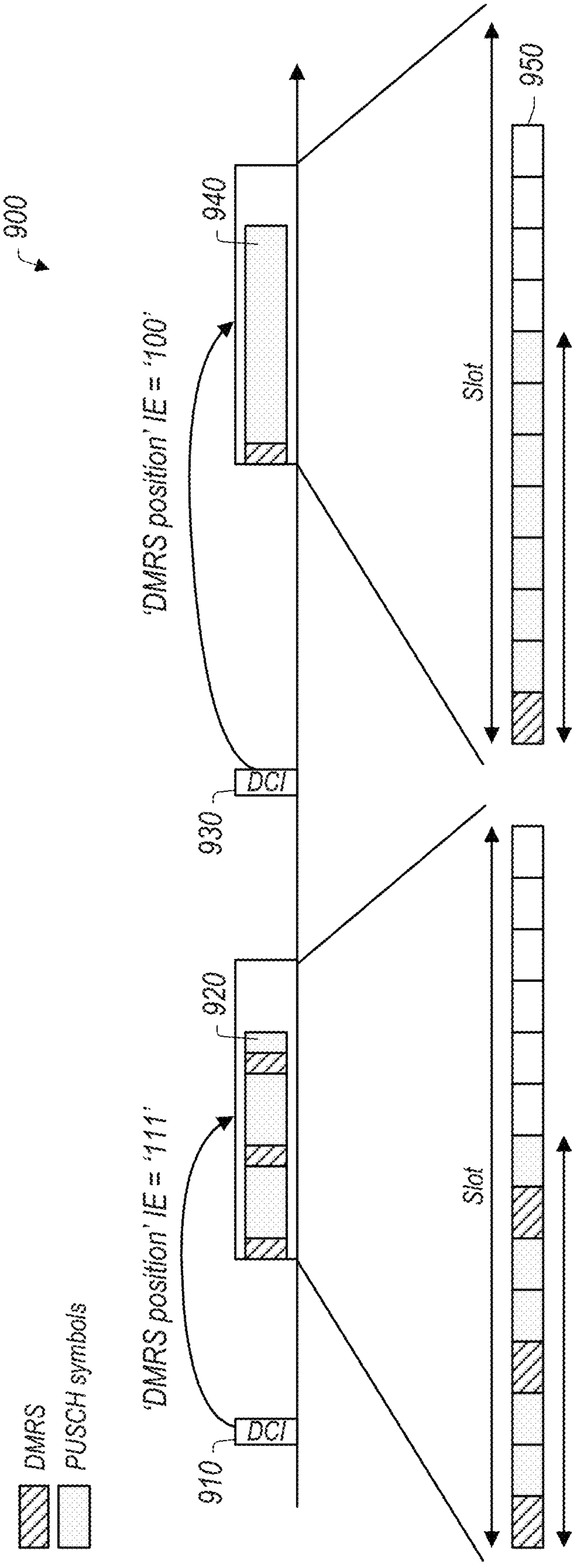
FIG. 9 is a diagram illustrating an example of DCI-based DMRS pattern switching, according to some embodiments.

FIG. 9 shows a timing diagram 900 that illustrates one example of DMRS pattern switching across different PUSCH transmission occasions 920 and 940, according to the approach described above. For the example shown in FIG. 9, it is assumed that the uplink transmission, e.g. the PUSCH, is scheduled with a time domain resource allocation (TDRA) length of 8 symbols. Referring to FIG. 9, the 3-bit value of the 'DMRS position' IE in the scheduling DCI 910 is set to '111'. Accordingly, in reference to Table 1, the DMRS pattern of 'Pos3' (defined in Rel-15/16 of the 3GPP specification) may be used for PUSCH transmission 920. On the other hand, the 3-bit value of the 'DMRS position' IE in the subsequent scheduling DCI 930 may be set to '100' e.g. when the UE is moving from a cell center to the cell edge. In this case, the DMRS pattern of 'Pos0' (defined in Rel-15/16 of the 3GPP standard) may be used for PUSCH transmission 940 to lower the code rate of PUSCH.

Second Approach

According to a second approach, for PUSCH repetitions, the size of the 'DMRS position indicator' field (e.g. in reference to Table 1) may only be a single bit, with the values for the bit defined as follows:

'0': use a DMRS pattern for each Type-B repetition. That is, a DMRS pattern defined for a transmission length that matches the length of a single repetition may be used.

'1': DMRS position is determined based on the aggregated number 'N' of repetitions. That is, a DMRS pattern defined for a transmission length that matches the length of 'N' repetitions considered aggregately may be used. The repetition number 'N' (i.e. the number of repetitions) may be implicitly determined to include all repetitions of a TTI bundle or TTI bundles within a single slot, or it may be configured by higher layers via dedicated RRC signaling.

Figure 10:
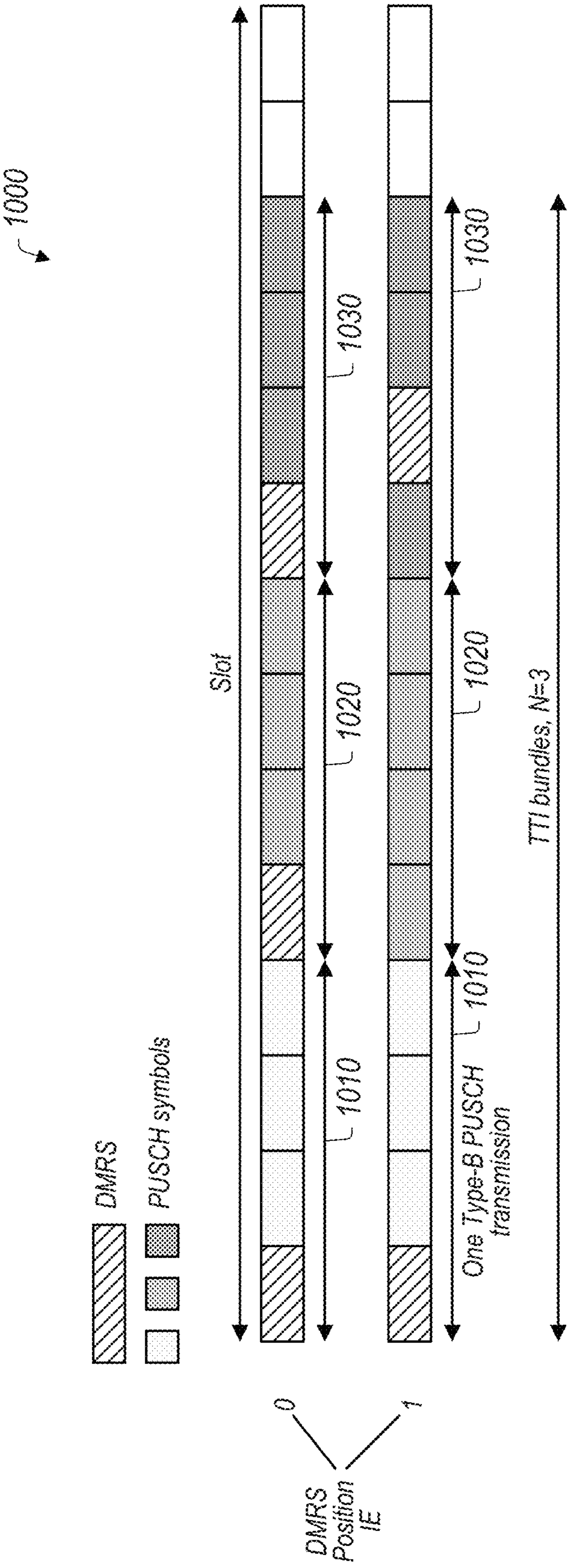
FIG. 10 is a diagram illustrating an example of DMRS pattern adaption for multiple length-4 Type B repetitions within a slot, according to some embodiments.

FIG. 10 shows a timing diagram that illustrates one example of the second approach for DMRS symbol indication during a 4-symbol PUSCH transmission with three repetitions (1010, 1020, 1030) within a single slot, assuming the existing (reused) DMRS pattern is "Pos 0" (in reference to Table 1), which positions the DMRS in the first symbol of the repetition. As shown in FIG. 10, each PUSCH repetition contains one DMRS symbol if the DMRS position indicator IE is set to '0'. When the DMRS position indicator IE is set to '1', the DMRS symbol pattern is determined based on the aggregated 3 PUSCH repetitions. Consequently, the DMRS is transmitted in symbol #0 and symbol #9 for the aggregated 3 PUSCH repetitions in the TTI bundle. In comparison to a setting of '0' for the DMRS position indicator IE, the number of DMRS symbols (or number of DMRS transmissions) is reduced from 3 to 2 over the aggregated 3 PUSCH repetitions, and results in (3−2)/3=33% overhead reduction for DMRS transmission. In the latter case, the DMRS transmission is based on selection of the DMRS pattern defined for a 12-symbol PUSCH length (which equals the total length of the aggregated 3 PUSCH transmissions of 4 symbols each) in Rel-15 of the 3GPP specification, which results in no DMRS symbol being transmitted in Type B transmission 1020, and all symbols may be used for data transmission to lower the code rate.

Third Approach

According to a third approach, a set of DMRS patterns may be first configured by higher layers similar to the first approach, but on a per UE basis. Then, selection of one of these configured DMRS patterns may be dynamically signaled via a dedicated "DMRS position indicator" field in the scheduling DCI format, similar to the first approach. This approach may provide the best flexibility for the base station to allocate the DMRS symbol location and control the signaling overhead based on UE-specific channel conditions. However, it may also result in RRC signaling overhead when signaling different DMRS patterns to different UEs.

Fourth Approach

Figure 11:
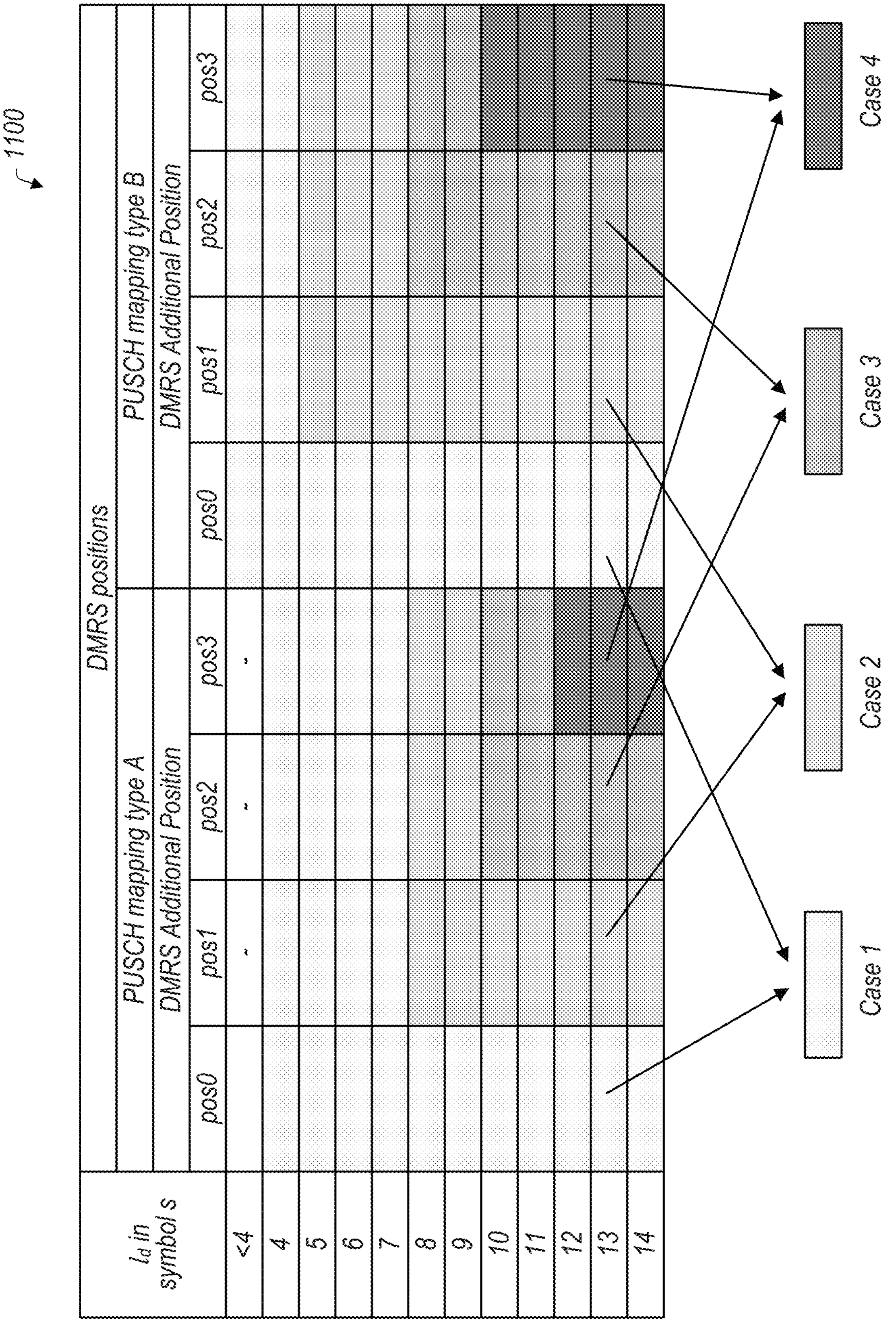
FIG. 11 shows a table illustrating different DMRS adaptation cases, according to some embodiments.

According to a fourth approach, a new set of DMRS patterns may be hard-encoded in the 3GPP specification. However, unlike in the current NR design, the new DMRS patterns may be defined on a per TTI-bundle basis over a set of transmission occasions to achieve a reduced DMRS density over the TTI bundle. According to some aspects, a specified number (e.g. four) cases for DMRS adaptation may be defined based on the value of a 'DMRS Additional Position' configuration parameter, TDRA length, and the number of repetitions within a TTI bundle, as shown in the exemplary table 1100 of FIG. 11.

For Case 1, there may be one DMRS symbol per transmission, while, for Cases 2, 3, and 4, there may be 2, 3 and 4 DMRS symbols, respectively, within each transmission occasion or repetition. In addition, for each case, two sub-cases may be introduced based on the repetition number (or number of repetitions) within a TTI bundle. Accordingly, Case xA may represent Case x with one transmission occasion within a TTI bundle, while Case xB may represent Case x with multiple ('N') transmission occasions within a TTI bundle, where N>1. For example, Case 1A represents Case 1 (that is, a single DMRS per transmission occasion), with a single transmission occasion within a TTI bundle, and Case 1B represents Case 1 (again, a single DMRS per transmission occasion) with N>1 transmission occasions or repetitions within a TTI bundle.

Pursuant to the above, a new 'DMRS pattern' field may be added to the scheduling DCI to indicate the DMRS locations for multiple PUSCH repetitions in a TTI bundle, as illustrated by tables 1200, 1210, and 1210 of FIG. 12, indicated by the "DMRS position" field in each table. With respect to the values of X, Y, and Z appearing in the tables, the following options may be implemented:

Option 1: The value of 'X', 'Y' and 'Z' are fixed in the specification. E.g., in reference to table 1200, the values may be set to X=2, Y=3 and Z=4.

Option. 2: The value of 'X', 'Y' and 'Z' may be configured by higher layers, e.g. via dedicated RRC signaling on a per UE basis.

Option 3: To reduce signaling overhead, the values of 'Y' and/or 'Z' may be implicitly derived based on the value of X, e.g. by setting Y=AX and Z=AY, where 'A' is a scaling factor which may be configured via higher layer signaling, e.g. via RRC signaling. For example, in some embodiments, Y and Z may be defined as Y=2X and Z=2Y=4X.

According to some aspects, patterns 1, 2 and 3 (indicated in table 1200) may represent limits to be applied for all of Cases (in reference to table 1100) except for Case 1, which already includes only a single DRMS transmission per transmission occasion. Tables 1210 and 1220 provide examples for patterns 1, 2, and 3 with X=2, Y=3 and Z=4, with the DMRS symbols within a transmission occasion numbered in increasing order in the time domain, starting from 0. The 1-bit or 2-bit "DMRS position field" is defined as shown in Tables 1210 and 1220, and may be used to dynamically cancel a subset of DMRS symbols in a transmission occasion in order to reduce DMRS overhead when possible and warranted.

Pursuant to the above, a variety of DMRS patterns may be considered for patterns 1, 2, and 3, to achieve a smaller number of DMRS symbols in different cases configured in Table 1100. For example, for Case 1 in Table 1100, Pattern 'N' may be defined as a DMRS symbol transmitted in one occasion 'i' of every X, Y, or Z transmission occasion within a TTI bundle, respectively. This DMRS transmission may be configured according to the following different options:

Option 1: Transmission occasion T is the first transmission occasion every X, Y, or Z transmission occasion.

Option 2: Transmission occasion 'i' is the occasion that contains the symbol index l=[L/2] or l=[L/2]−1 relative to the starting symbol of the TTI bundle, where L is the number of symbols in the 'A/B/C' aggregated occasions. The DMRS may be transmitted on symbol index l=[L/2]−1.

Option. 3: Transmission occasion T within a TTI bundle is configured via RRC signaling.

Figure 13:
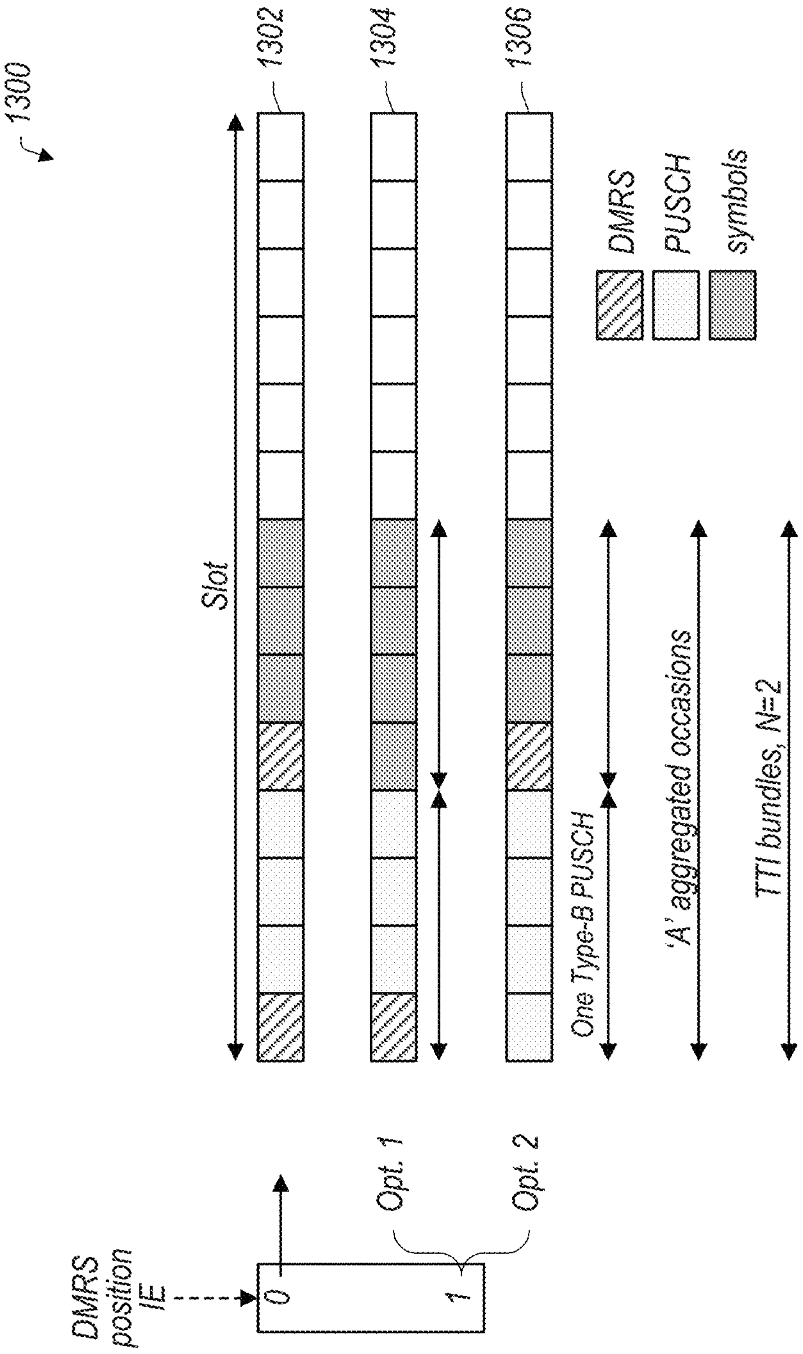
FIG. 13 is a diagram illustrating an example of DMRS transmission adaption, according to some embodiments.

The size of the 'DMRS pattern' field may be reduced to 1 bit if the TTI bundle size configured via RRC signaling is up to two transmission occasions. FIG. 13 shows a timing diagram 1300 illustrating one example of DMRS adaptation for Case 1 using a 1-bit 'DMRS Position IE' (in reference to table 1210) in the DCI, assuming a 4-symbol PUSCH transmission with 2 repetitions in a TTI bundle, i.e. N=2. As seen in diagram 1300, when the DCI IE value is '0', there is no DMRS overhead reduction and one DMRS is transmitted in each repetition of a TTI bundle (1302). When the DMRS pattern is defined according to option 1, a value of '1' for the DCI IE results in the DMRS transmitted in the first repetition only (1304), whereas when the DMRS pattern is defined according to option 2, the DMRS is transmitted in the second repetition only (1306).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor comprising:

memory configured to store information; and processing circuitry coupled with the memory and configured to:

cause a User Equipment (UE) to receive, in downlink control information (DCI) from the base station, an information element (IE) corresponding to a demodulation reference signal (DMRS) to be included in an uplink transmission of the UE scheduled by the DCI;

cause the UE to receive reference signal pattern information provided by the base station, the reference signal pattern information specifying a plurality of different DMRS patterns for a single DMRS transmission;

determine, based at least on the received IE and the received reference signal pattern information, time occasions (TOs) during which to transmit the DMRS in the uplink transmission, wherein to determine the TOs the processing circuitry is configured to select a DMRS pattern from the plurality of different DMRS patterns according to the received IE; and cause the UE to transmit the DMRS during the determined TOs in the uplink transmission.

2. The baseband processor of claim 1, wherein the reference signal pattern information is received via higher layer signaling.

3. The baseband processor of claim 1, wherein the plurality of different DMRS patterns includes one or more of:

DMRS patterns from a predefined table; or

DMRS patterns configured specifically for the UE.

4. The baseband processor of claim 1, wherein at least one of the plurality of different DMRS patterns corresponds to a transmit time interval bundle that does not include a reference signal transmission.

5. The baseband processor of claim 1, wherein the reference signal pattern information includes, for each DMRS pattern of the plurality of different DMRS patterns:

a first parameter indicative of a transmit time interval (TTI) bundle length for the uplink transmission; and a second parameter indicative of which TO of a TTI bundle is to include the DMRS.

6. The baseband processor of claim 1, wherein the DCI is received in a UE specific search space.

7. The baseband processor of claim 1, wherein the uplink transmissions include transmission of a physical uplink shared channel.

8. The baseband processor of claim 1, wherein the processing circuitry is further configured to:

cause the UE to receive, in a second DCI from the base station, a second IE corresponding to a second DMRS to be included in a second uplink transmission of the UE scheduled by the second DCI; and (a) determine, based at least on the received second IE, second TOs for each repetition of a number of repetitions in the second uplink transmission individually, when the second IE has a first value; and (b) determine the second TOs for the number of repetitions considered aggregately, when the second IE has a second value.

9. The baseband processor of claim 8;

wherein (a) comprises using a DMRS pattern defined for a transmission length matching a length of a single repetition; and wherein (b) comprises using a DMRS pattern defined for a transmission length matching a length of the number of repetitions considered aggregately.

10. The baseband processor of claim 8, wherein the number of repetitions is:

defined to include all repetitions within a single slot of the second uplink transmission; or configured via higher layer signaling.

11. The baseband processor of claim 1, wherein the processing circuitry is further configured to:

cause the UE to receive, in a second DCI from the base station, a second IE corresponding to a second DMRS to be included in a second uplink transmission of the UE scheduled by the second DCI, wherein the second IE provides an indication of a DMRS pattern configured for a transmit time interval (TTI) bundle for one or more TTI bundles of the second uplink transmission.

12. The baseband processor of claim 11, wherein the DMRS pattern defines one or more of:

a number of transmissions of the DMRS per repetition in the TTI bundle;

respective locations of the DMRS in the TTI bundle; or a total number of transmissions of the DMRS in the TTI bundle.

13. The baseband processor of claim 11, wherein the DMRS pattern is defined based at least on one or more of:

a reference signal position configuration parameter;

a time domain resource allocation length; or a number of repetitions in the TTI bundle.

14. A base station comprising:

radio circuitry configured to enable wireless communications of the base station with at least a user equipment (UE); and a processor communicatively coupled to the radio circuitry and configured to:

transmit, via the radio circuitry to the UE, reference signal pattern information specifying a plurality of different demodulation reference signal (DMRS) patterns for a single DRMS transmission;

transmit, via the radio circuitry to the UE, downlink control information (DCI), wherein the DCI includes:

scheduling information that schedules an uplink transmission of the UE; and an information element (IE) corresponding to a DMRS to be included in the uplink transmission, wherein the IE and the reference pattern information enables the UE to determine time occasions (TOs) corresponding to a selected DMRS pattern of the plurality of different DMRS patterns during which to transmit the DMRS in the uplink transmission, wherein the IE is useable by the UE to determine the TOs by selecting a DMRS pattern from the plurality of different DMRS patterns according to the IE.

15. The base station of claim 14, wherein the plurality of different DMRS patterns include one or more of:

DMRS patterns from a predefined table; or

DMRS patterns configured specifically for the UE.

16. The base station of claim 14, wherein the reference signal pattern information is transmitted via higher layer signaling.

17. A user equipment device (UE) comprising:

radio circuitry configured to enable wireless communications of the UE with at least one base station; and a processor communicatively coupled to the radio circuitry and configured to:

receive, via the radio circuitry, in downlink control information (DCI) from the base station, an information element (IE) corresponding to a demodulation reference signal (DMRS) to be included in an uplink transmission of the UE scheduled by the DCI;

receive, via the radio circuitry from the base station, reference signal pattern information specifying a plurality of different DMRS patterns for a single DMRS transmission;

determine, based at least on the received IE and the received reference signal pattern information, time occasions (TOs) during which to transmit the DMRS in the uplink transmission, wherein to determine the TOs the processor is configured to select a DMRS pattern from the plurality of different DMRS patterns according to the received IE; and transmit, via the radio circuitry, the DMRS during the determined TOs in the uplink transmission.

18. The UE of claim 17, wherein the reference signal pattern information is received via higher layer signaling.

19. The UE of claim 17, wherein the plurality of different DMRS patterns include one or more of:

DMRS patterns from a predefined table; or

DMRS patterns configured specifically for the UE.

* * * * *